United States Patent
Sun et al.

(10) Patent No.: US 8,670,362 B2
(45) Date of Patent: Mar. 11, 2014

(54) POWER STATE AND MEDIUM ACCESS COORDINATION IN COEXISTING WIRELESS NETWORKS

(75) Inventors: Yanjun Sun, Richardson, TX (US);
Ariton E. Xhafa, Plano, TX (US);
Ramanuja Vedantham, Allen, TX (US);
Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 197 days.

(21) Appl. No.: 13/190,858

(22) Filed: Jul. 26, 2011

(65) Prior Publication Data
US 2012/0020266 A1  Jan. 26, 2012

Related U.S. Application Data

(60) Provisional application No. 61/367,705, filed on Jul. 26, 2010.

(51) Int. Cl.
*G08C 17/00* (2006.01)

(52) U.S. Cl.
USPC ............................. 370/311; 370/277; 370/328

(58) Field of Classification Search
USPC ........ 370/310, 311, 277, 328; 340/7.32–7.38; 455/343.1–343.6
See application file for complete search history.

(56) References Cited

U.S. PATENT DOCUMENTS

| | | | |
|---|---|---|---|
| 7,046,649 B2 * | 5/2006 | Awater et al. | 370/338 |
| 7,340,236 B2 * | 3/2008 | Liang et al. | 455/277.2 |
| 7,486,955 B2 * | 2/2009 | Fukushima | 455/452.1 |
| 8,107,882 B2 * | 1/2012 | Fischer et al. | 455/63.1 |
| 8,265,048 B1 * | 9/2012 | Donovan | 370/338 |
| 8,335,206 B1 * | 12/2012 | Hirsch et al. | 370/350 |
| 2008/0192666 A1 * | 8/2008 | Koskan et al. | 370/311 |

OTHER PUBLICATIONS

Simonite, Tom, "How Wi-Fi Drains Your Cell Phone," Technology Review, Jun. 24, 2010, 2 pages, found at: http://www.technologyreview.in/communications/25651/.
Wi-Fi Alliance, Wi-Fi Peer-to-Peer (P2P) Technical Specification, Wi-Fi Alliance Technical Committee P2P Task Group, 2010, 153 pages.

* cited by examiner

*Primary Examiner* — Hassan Kizou
*Assistant Examiner* — Hashim Bhatti
(74) *Attorney, Agent, or Firm* — Steven A. Shaw; Wade James Brady, III; Frederick J. Telecky, Jr.

(57) ABSTRACT

Apparatus and method for improving throughput in a wireless device accessing coexisting networks. In one embodiment, a wireless device includes first and second wireless transceivers, a power state controller, and an access controller. The first wireless transceiver is configured to access a first wireless network. The second wireless transceiver is configured to access a second wireless network. The power state controller is configured to switch the first wireless transceiver between an active state and a sleep state. The power consumed by the first wireless transceiver while in the sleep state is reduced relative to the active state. The access controller is configured to alternately allocate a wireless medium to the first wireless transceiver and the second wireless transceiver. The power state controller and the medium access controller are configured to coordinate power state switching of the first wireless transceiver and wireless medium access by the second wireless transceiver.

23 Claims, 3 Drawing Sheets

POWER STATE AND MEDIUM ACCESS COORDINATION IN COEXISTING WIRELESS NETWORKS

CROSS-REFERENCE TO RELATED APPLICATION

The present application claims priority to U.S. Provisional Patent Application No. 61/367,705, filed on Jul. 26, 2010; which is hereby incorporated herein by reference in its entirety.

BACKGROUND

As wireless technologies proliferate, mobile wireless devices incorporate systems based on a multiplicity of different wireless standards. Such devices are capable of accessing multiple wireless networks simultaneously, and are referred to herein as "combo" devices.

Wireless networks accessed by a combo device may use overlapping or adjacent portions of the wireless spectrum. For example, BLUETOOTH and IEEE 802.11b/g/n based networks both utilize the 2.4-2.5 GHz band. Access to the networks can be coordinated via time multiplexing or frequency multiplexing to reduce performance degradation caused by collisions/interference that may occur when the networks are simultaneously accessed. Such multiplexing reduces the medium time available to each radio and consequently lowers network performance, as a radio may be blocked from transmitting or receiving packets temporally to avoid collision and/or interference with the colocated radio.

Wireless transceivers are one major source of energy consumption in battery powered mobile/embedded devices. Assigning a low power state (i.e., a sleep state or doze state) to a transceiver is one technique for improving energy efficiency in such a device. While in the sleep state, some or all components of a radio transceiver are turned off or operate in a reduced power state, which greatly reduces energy consumption. A transceiver is unable to access the wireless medium while in the sleep state.

SUMMARY

Apparatus and methods for coordinating power state scheduling and medium access scheduling in a wireless device incorporating collocated wireless transceivers. In one embodiment, a wireless device includes a first wireless transceiver, a second wireless transceiver, a power state controller, and an access controller. The first wireless transceiver is configured to access a first wireless network. The second wireless transceiver is configured to access a second wireless network. The power state controller is configured to change a power state of the first wireless transceiver between an active state and a sleep state. The power consumed by the first wireless transceiver while in the sleep state is reduced relative to power consumed by the first wireless transceiver while in the active state. The access controller is configured to alternately allocate a wireless medium to the first wireless transceiver and the second wireless transceiver. The power state controller and the medium access controller are configured to coordinate changing the power state of the first wireless transceiver and wireless medium access by the second wireless transceiver.

In another embodiment, a combo device scheduler includes a power state scheduler and a medium access scheduler. The power state scheduler is configured to schedule power state switching of a first wireless transceiver of a combo device between an active state and a sleep state. The power consumed by the first wireless transceiver while in the sleep state is reduced relative to the power consumed while in the active state. The medium access scheduler is configured to schedule alternate wireless medium access by the first wireless transceiver and a second wireless transceiver of the combo device. The power state scheduler and the medium access scheduler are configured to coordinate the power state switching of the first wireless transceiver and medium access of the second wireless transceiver.

In yet another embodiment, a method for operating a combo device includes determining, by the combo device, a schedule for switching a first wireless transceiver of the combo device between an active state and a sleep state. The power consumed by the first wireless transceiver while in the sleep state is reduced relative to the power consumed while in the active state. A schedule for alternating wireless medium access between the first wireless transceiver and a second wireless transceiver of the combo device is determined by the combo device. As part of the determining of at least one of the schedule for switching and the schedule for alternating, power state switching of the first wireless transceiver and wireless medium access by the second wireless transceiver is coordinated.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. Further, the term "software" includes any executable code capable of running on a processor, regardless of the media used to store the software.

Thus, code stored in memory (e.g., non-volatile memory), and sometimes referred to as "embedded firmware," is included within the definition of software.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Throughput and power consumption are important and distinguishing features for mobile wireless devices. Consequently, mobile wireless devices are often designed to optimize throughput and reduce energy consumption. In a combo device, throughput may be optimized by reducing inter-transceiver interference and energy consumption may be reduced by maximizing time spent in the sleep state. However, in a combo device, network performance and/or device power consumption can suffer if transceiver multiplexing and power state control are managed individually. For example, if a transceiver is scheduled to sleep during a time interval that the transceiver is scheduled for medium access, then the medium access time may be wasted. Embodiments of the present disclosure coordinate transceiver power state transitions and transceiver medium access to optimize energy savings without sacrificing network throughput. References herein to medium access by a transceiver refer to time intervals during which the wireless medium is allocated/available to the transceiver for access.

Figure 1:
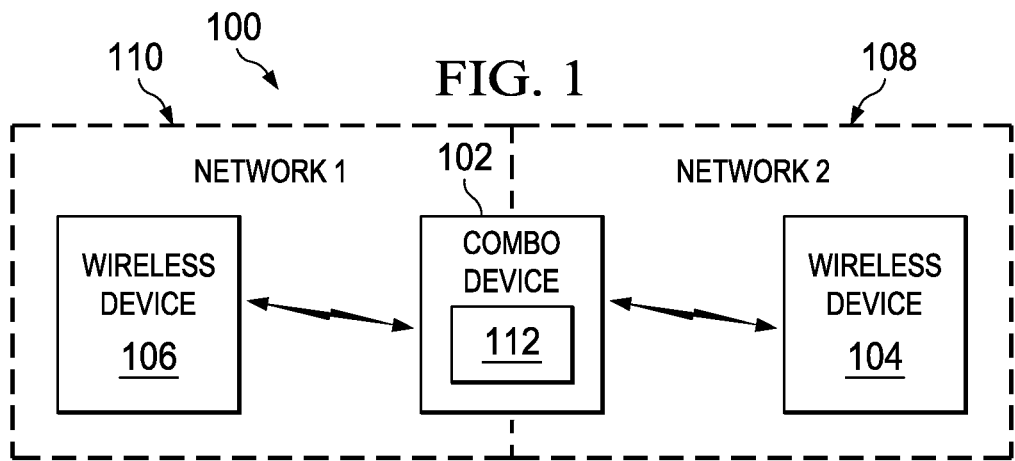
FIG. 1 shows a block diagram of a wireless system configured to coordinate power state transitions and wireless access of coexisting networks in accordance with various embodiments.

FIG. 1 shows a block diagram of a wireless system 100 configured to coordinate power state transitions and wireless access of coexisting networks in accordance with various embodiments. The system 100 includes a combo device 102 configured to communicate with wireless device 106 and with wireless device 104. Communication with wireless device 106 is via wireless network 1 110 (hereinafter "network 110"), and communication with wireless device 104 is via wireless network 2 108 (hereinafter "network 108"). The wireless network 110 may conflict with the wireless network 108. For example, the frequency bands used by the networks 108, 110 may be adjacent or overlapping.

Wireless network 110 may be a wireless local area network (WLAN) based on the IEEE 802.11 standard. In some embodiments, the wireless network 110 is a peer-to-peer network, e.g., a network compliant with the Wi-Fi Peer-to-Peer Specification promulgated by the WI-FI ALLIANCE. In a peer-to-peer network, devices 102, 106 communicate directly with one another using peer-to-peer protocols, rather than through a dedicated access point. One of the devices 102, 106 serves as a group owner that provides at least some of the functionality of an access point for the peer-to-peer network. The combo device 102 may be the group owner for the network 110, or alternatively, the wireless device 106 may be the group owner for the network 110 and the combo device 102 may be a station connected to the group owner.

Wireless network 108 may be based on a different wireless standard than wireless network 110 in some embodiments of the system 100. For example, if wireless network 1 is based on IEEE 802.11, then wireless network 108 may be based on the BLUETOOTH standard or another wireless standard.

In some embodiments of the system 100, the wireless network 108 may be based on the same wireless standard as the wireless network 110. For example, both networks 110, 108 may be based on the IEEE 802.11 standard. Accordingly, the wireless network 108 may be an infrastructure based WLAN or a peer-to-peer WLAN. In contrast to the peer-to-peer network described above, an infrastructure network is a network in which wireless stations access the network via a dedicated access point. Either of wireless device 104 and combo device 102 may serve as an access point. Similarly, if wireless network 108 is a peer-to-peer network, then either of wireless device 104 and combo device 102 may serve as a group owner. In such embodiments of the system 100 where both networks 108, 110 are WLANs, the combo device 102 is concurrently a member of two different basic service sets.

To reduce interference between the two coexisting wireless networks 108, 110, the combo device 102 apportions access to the wireless medium such that only one of the two networks 108, 110 is accessed at a time. The combo device 102 includes a scheduler 112 that allocates medium access to transceivers of the combo device 102. The scheduler 112 also directs power state transition timing to reduce combo device 102 power consumption. Embodiments of the scheduler 112 coordinate scheduling of power state transitions and wireless medium access to optimize combo device 102 throughput and power consumption. For example, the scheduler 112 may set the timing of one or both of network access and a transceiver sleep state to reduce or eliminate overlap between the sleep state of a transceiver and a period of wireless network access by the transceiver.

Figure 2:
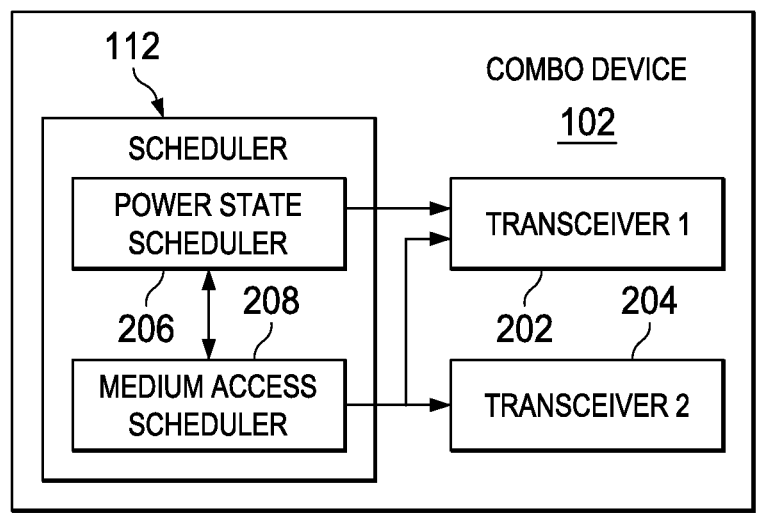
FIG. 2 shows block diagram of a wireless device that includes coordinated power state and network access scheduling in accordance with various embodiments.

FIG. 2 shows block diagram of the combo device 102. The combo device 102 includes a first transceiver 202 and a second transceiver 204. The first transceiver 202 is configured to access the wireless network 110. The second transceiver 204 is configured to access wireless network 108. Each of the transceivers 202 204 may include encoding and decoding systems, modulation and demodulation systems, baseband and radio frequency systems, etc. that enable access to the corresponding wireless network.

The scheduler 112 is coupled to the transceivers 202, 204. The scheduler 112 includes a power state scheduler 206 and a medium access scheduler 208. The medium access scheduler 208 controls access to the wireless medium by the transceivers 202, 204. For example, the medium access scheduler 208 may alternately allocate the wireless medium to each of transceivers 202, 204. The duration and/or timing of medium allocation to each transceiver 202, 204 may be determined based on, for example, the amount and/or type of data to be transferred via the wireless network accessed by the transceiver 202, 204. For example, transfer of audio data of a predetermined quality via the wireless network 108 may require periodic data transfer and corresponding periodic allocation of medium access to the transceiver 2 204 by the medium access scheduler 208.

The power state scheduler 206 controls the timing of changes from one power state to another by the transceivers 202, 204 and the duration of the power states. Power consumed by each of transceivers 202, 204 is reduced by scheduling the transceiver for sleep state rather than active state. As used herein, the term sleep state refers to any power state that causes the transceiver to consume less power than the transceiver consumes when in a power state that allows the transceiver to access the wireless medium. The sleep state may also be referred to as doze state or similar terms. Sleep state may reduce transceiver power consumption by disabling clocks, reducing voltages, disabling processing functions, etc. In order to access the wireless medium, the transceiver 202, 204 to which the medium is allocated should be in the active state rather than the sleep state.

The power state scheduler 206 and the medium access scheduler 208 cooperate to optimize the sleep schedule and the medium access schedule. For example, under some operational conditions, the sleep schedule assigned by the power state scheduler 206 to transceiver 1 202 may be fixed (e.g., determined by a different wireless device (e.g., device 106) in network 110). Under such conditions, the power state scheduler 206 may be unable to adjust the sleep state transition timing applied to transceiver 1 202. However, the medium access scheduler 208 can adjust the access schedules assigned to transceiver 1 202 and/or transceiver 2 204 to optimize overlap of the transceiver 2 204 access schedule with the transceiver 1 202 sleep schedule. Under other operating conditions, the power state scheduler 206 and the medium access scheduler 208 may determine, adjust, and/or assign a sleep schedule and/or a medium access schedule at least one of transceiver 1 202 and transceiver 2 204 that reduce overlap between the sleep schedule for a transceiver and the medium access schedule for the transceiver.

Figure 3:
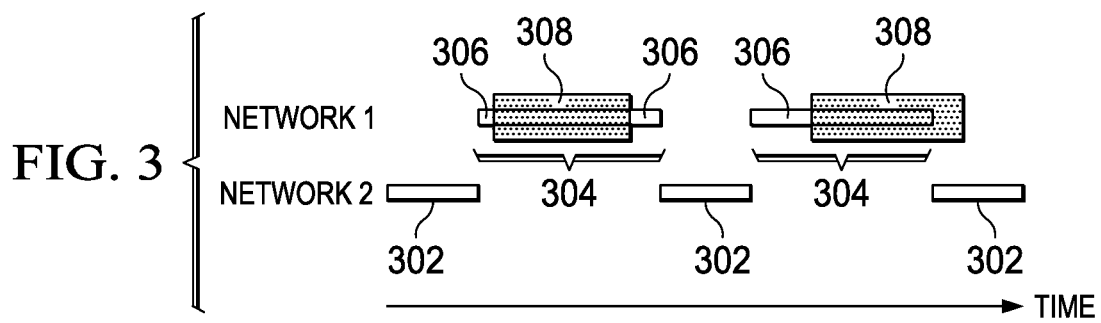
FIG. 3 shows a diagram of uncoordinated power state transitions and wireless network access in a combo device.

As an example of uncoordinated scheduling and associated detrimental effects on a combo device, FIG. 3 shows a diagram of uncoordinated power state transitions and wireless network access in a conventional combo device. A first transceiver is scheduled to access network 1 during times 304 and a second transceiver is scheduled to access network 2 during times 302. The access times for the two transceivers are non-overlapping to reduce interference. The first transceiver is scheduled for sleep state during times 308. Consequently, the first transceiver can only access the network during times 306, and much of the allocated network access time is wasted. Furthermore, the first transceiver is in active state (not in sleep state time 308) during times 302, which are allocated to the second transceiver, needlessly increasing the power consumed by the first transceiver. The situation illustrated in FIG. 3 can occur, for example, when a different wireless device (e.g., a group owner) establishes the sleep state schedule and the conventional combo device lacks coordination of power state scheduling and network access scheduling.

Figure 4:
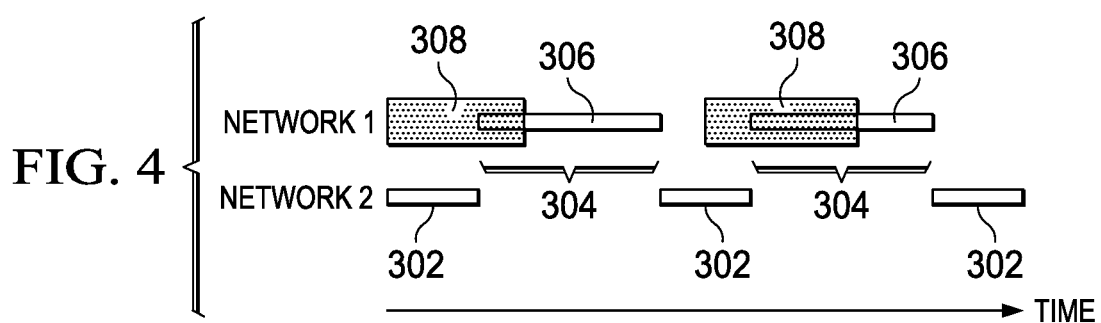
FIG. 4 shows a first diagram of coordinated power state transitions and wireless network access in accordance with various embodiments.

FIG. 4 shows a first diagram of coordinated power state scheduling and wireless network access by the scheduler 112 in accordance with various embodiments. In FIG. 4, the transceiver 1 202 sleep intervals 308 are fixed as in FIG. 3. Similarly, the relative timing of wireless medium access 302, 304 allocated respectively to transceiver 204 and 202 is fixed. Such conditions may be created when the combo device 102 is operating as a station of network 110 (a wireless local area network) and as a master transferring synchronous connection oriented (SCO) traffic on network 108 (a BLUETOOTH network).

Because the power state schedule is fixed and cannot be adjusted by the power state scheduler 206, the medium access scheduler 208 adjusts (slides) the medium access timing 302, 304 to better align the transceiver 1 202 sleep state intervals 308 with transceiver 2 204 medium accesses 302. By adjusting the medium access timing 302, 304 to better correspond to the sleep state timing, the throughput of transceiver 1 202 is greatly increased (e.g., doubled relative to that of FIG. 3) while power consumption of transceiver 1 202 remains unchanged.

The medium access scheduler 208 determines an offset value (or a set of candidate offset values) between the start of the next medium access by transceiver 2 204 and the next transition to sleep state by the transceiver 1 202 that maximizes transceiver 1 sleep state and transceiver 2 media access allocation overlap. The determination is based on the period and duration of the sleep state intervals and the transceiver 2 medium accesses. When the medium access scheduler 208 has determined the offset value, the medium access scheduler 208 can adjust the transceiver 2 medium access timing. For example, if network 108 is a BLUETOOTH network, then the medium access scheduler 208, via the transceiver 2 204, can force the wireless device 104 (a BLUETOOTH slave device) to gradually drift its clock forward or backwards thereby shifting the BLUETOOTH network activities. Via such shifting, the desired offset for maximum overlap between transceiver 1 sleep state 308 and transceiver 2 medium access 302 is eventually achieved, resulting in increased transceiver 1 throughput.

Figure 5:
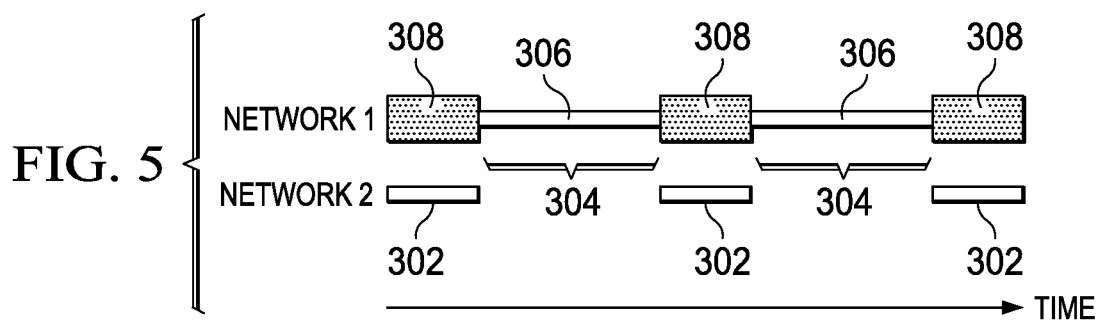
FIG. 5 shows a second diagram of coordinated power state transitions and wireless network access in accordance with various embodiments.

FIG. 5 shows a diagram of coordinated power state transitions and wireless network access with sleep state adjustment in accordance with various embodiments. Embodiments of the scheduler 112 can further improve transceiver 1 throughput, over the results of FIG. 4, without increasing power consumption, when sleep state timing 308 can be adjusted. Various embodiments of the combo device 102 can exercise control over the sleep state schedule 308. For example, if the combo device 102 is a group owner of the peer-to-peer network 110, then the power state scheduler 206 can control the sleep state 308 transition time and duration. In FIG. 5, the power state scheduler 206 has adjusted the transceiver 1 sleep state schedule such that the sleep state timing 308 is aligned with transceiver 2 medium access timing 302. The length of each sleep interval has been reduced and the frequency of sleep intervals has been increased relative to FIG. 4. As a result, the overall time spent in the sleep state and transceiver 1 power consumption are unchanged, while transceiver 1 medium access time 304 is increased, relative to that of FIG. 4.

Embodiments of the scheduler 112 may adjust the sleep state schedule and/or the medium access schedule of transceiver 202, 204 to optimize throughput and power consumption of the combo device 102. In some embodiments, the schedule (sleep or access) having the least flexibility for adjustment is used as the basis for adjustment of the more flexible schedule. Thus, in FIG. 4, the sleep schedule 308 of transceiver 1 202 is inflexible (i.e., the sleep schedule is fixed by wireless device 106), and the scheduler 112 adjusts the medium access timing 302 of transceiver 2 204 to maximize overlay between the sleep state transitions 308 and the medium accesses 302.

The medium access scheduler 208 can implement various strategies to adjust transceiver 202, 204 medium access timing for improved overlay with sleep state. For example in IEEE 802.11 based wireless local area networks (including peer-to-peer variants), beacon signals transmitted by the transceiver 1 202 include timestamps that can be used to force the wireless device 106 (i.e., a station in network 1) to shift its clock to the desired time, thereby shifting medium access timing to produce a desired relationship with power state transition timing. In a BLUETOOTH network, transceiver 2 204 can shift its clock and thus transmission timing gradually to force the wireless device 104 (a slave node) to drift its clock.

Embodiments of the power state scheduler 206 may adjust the duration, frequency, and/or other timing parameters associated with sleep state. In some embodiments, the sleep state schedule is determined based on the priority of network traffic flows associated with the transceivers 202, 204. Traffic with the highest priority and/or least scheduling flexibility is scheduled first by the medium access scheduler 208. For example, BLUETOOTH SCO traffic (e.g., high quality voice (HV3) traffic) on transceiver 2 204 may have higher priority than a file download over WLAN on transceiver 1 202. Consequently, the medium access scheduler 208 establishes the schedule for the SCO traffic first. The power state scheduler 206 then schedules the transceiver 1 202 for sleep state during intervals when transceiver 2 204 is scheduled to transfer the SCO traffic, thereby maximizing transceiver 1 202 power savings.

Various components of the wireless device 102, including at least some portions of the scheduler 112, including the power state scheduler 206 and/or the medium access scheduler 208 can be implemented using a processor executing software programming that causes the processor to perform the operations described herein. In some embodiments, a processor executing software programming can determine an offset value for adjustment of medium access schedule, prioritize traffic flows, and/or establish power state or medium access schedules for the transceivers 202, 204 as described herein.

Suitable processors include, for example, general-purpose microprocessors, digital signal processors, and microcontrollers. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Software programming that causes a processor to perform the operations disclosed herein can be stored in a computer readable storage medium. A computer readable storage medium comprises volatile storage such as random access memory, non-volatile storage (e.g., a hard drive, an optical storage device (e.g., CD or DVD), FLASH storage, or combinations thereof.

Some embodiments can implement portions of the wireless device 102, including portions of the scheduler 112 using dedicated circuitry (e.g., dedicated circuitry implemented in an integrated circuit). Some embodiments may use a combination of dedicated circuitry and a processor executing suitable software. For example, some portions of the scheduler 112 may be implemented using a processor or hardware circuitry. Selection of a hardware or processor/software implementation of embodiments is a design choice based on a variety of factors, such as cost, time to implement, and the ability to incorporate changed or additional functionality in the future.

Figure 6A:
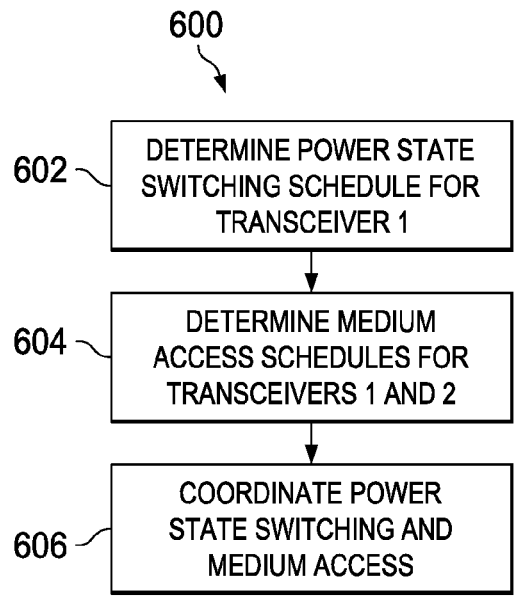
FIGS. 6A-6C shows flow diagram for a methods for scheduling power state transitions and medium access in a combo device in accordance with various embodiments.

FIG. 6A shows a flow diagram 600 for a method for scheduling power state transitions and medium access in a combo device in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be implemented by a processor executing instructions stored in a computer readable medium.

In block 602, the combo device 102 is configured for concurrent operation on the coexisting wireless networks 108, 110. To manage power consumption, the combo device 102, via power state scheduler 206, determines a power state switching schedule for transceiver 1 202. The power state switching schedule defines the timing for changing between sleep and active power states in the transceiver 1 202. Power consumed by transceiver 1 202 is reduced while in the sleep state, and the transceiver 1 202 is capable of transferring data on wireless network 110 while in the active state. In some operational scenarios, the power state switching schedule for transceiver 1 202 is determined, at least in part, by timing information or constraints provided by the wireless device 106 (e.g., if the wireless device is the group owner of network 110). In such scenarios, the combo device 102 can do little to adjust the power state switching schedule prescribed by the device 106. In other operational scenarios, for example if the combo device is the group owner of the network 110, the combo device 102 has flexibility to set the power state switching schedule to optimize performance.

In block 604, the combo device 102, via medium access scheduler 208, determines a medium access schedule for transceiver 1 202 and a medium access schedule for transceiver 2 204. The determined medium access schedules reduce inter-network interference by establishing non-overlapping time slots during which only one of the transceivers 202, 204 has access to the wireless medium.

In block 606, the power state scheduler 206 and the medium access scheduler 208 cooperate to coordinate power state switching and medium access. Coordination of the power state and medium access schedules can improve throughput on wireless network 110 without increasing the power consumption of the combo device 102. Embodiments of the scheduler 112 may adjust the power state schedule and/or the medium access schedules to optimize combo device throughput. In some embodiments, the coordination includes adjusting at least one of the power state schedule of transceiver 1 202 and the medium access schedule of transceiver 2 204 to maximize overlap.

Figure 6C:
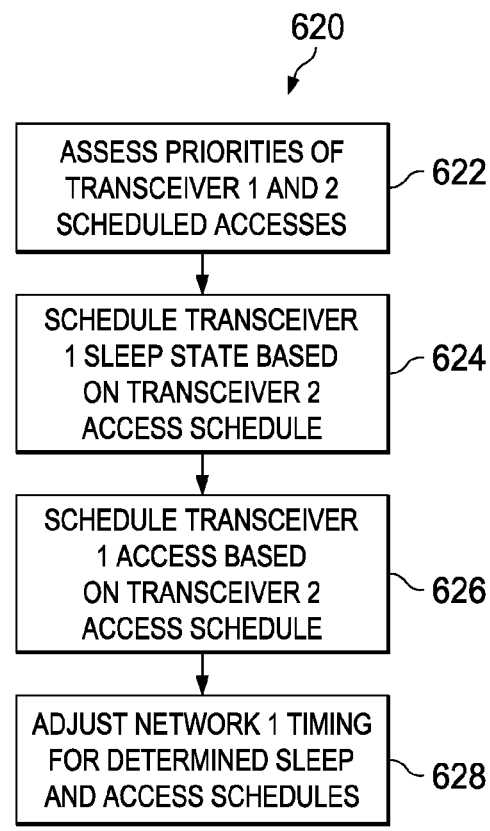
Figure 6B:
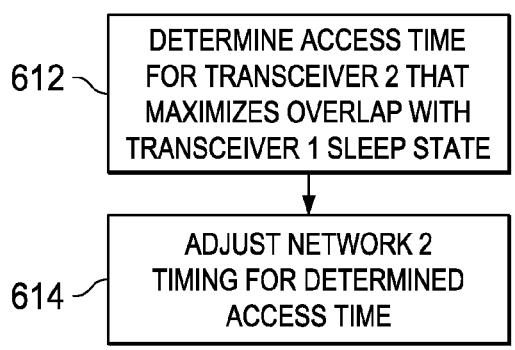

FIG. 6B shows flow diagram for a method 610 for adjusting a medium access schedule based on a power state switching schedule to optimize combo device 102 throughput in accordance with various embodiments. The operations of method 610 may be performed as part of the schedule coordination of block 606 of method 600. Though depicted sequentially as a matter of convenience, at least some of the actions shown can be performed in a different order and/or performed in parallel. Additionally, some embodiments may perform only some of the actions shown. In some embodiments, at least some of the operations of the method 610, as well as other operations described herein, can be implemented by a processor executing instructions stored in a computer readable medium.

In block 612, the scheduler 112 determines that the medium access schedule of transceiver 2 204 should be adjusted to maximize overlap with the sleep state schedule of transceiver 1 202. The determination may be based on the sleep state schedule being fixed and therefore unchangeable by the combo device 102. For example, the transceiver 1 202 power state schedule may set by the wireless device 106. In determining how the medium access schedule for transceiver 2 204 should be adjusted, the medium access scheduler 208 determines an offset between the next scheduled transceiver 2 204 medium access and the next transceiver 1 202 sleep state. The medium access schedule of transceiver 2 204 is adjusted according to the offset value to achieve maximum overlap between transceiver 1 202 sleep state and transceiver 2 204 medium access.

In block 614, the medium access scheduler 208 adjusts the medium access schedule of transceiver 2 204 based on the offset value. The adjustment may include causing the wireless device 104 to gradually drift its clock, thereby shifting the timing of medium access on network 108 to the determined offset location that positions the transceiver 2 204 medium access for maximum overlap with transceiver 1 202 sleep states.

FIG. 6C shows a flow diagram for a method 620 for adjusting a medium access schedule based on a power state switching schedule to optimize combo device 102 throughput in accordance with various embodiments. The operations of method 620 may be performed as part of the schedule coordination of block 606 of method 600. Though depicted sequentially as a matter of convenience, at least some of the actions shown can be performed in a different order and/or performed in parallel. Additionally, some embodiments may perform only some of the actions shown. In some embodiments, at least some of the operations of the method 620, as well as other operations described herein, can be implemented by a processor executing instructions stored in a computer readable medium.

In block 622, the scheduler 112 assesses the priorities of the various data flows using the transceivers 202, 204. Medium access for higher priority data flows is preferentially scheduled with respect to lower priority data flows. For example, a transceiver 2 audio data flow having more stringent timing requirements than a transceiver 1 file transfer data flow will be given medium access scheduling priority over the file transfer data flow.

In block 624, the transceiver 2 204 medium access schedule was established based on a high priority data flow on network 108. The power state scheduler 206 schedules sleep state switching of transceiver 1 202 based on the transceiver 2 204 medium access schedule such that the transceiver 1 202 sleep states maximally overlap the medium accesses of transceiver 2 204.

In block 626, responsive to the high priority data flows on transceiver 2, 204, the medium access scheduler 208 schedules medium access for transceiver 1 202 based on the medium access schedule of transceiver 2 204.

In block 628, the power state scheduler 206 adjusts the sleep state entry and duration timing of transceiver 1 202 based the determined sleep state schedule that provides maximal transceiver 2 204 medium access overlap. The medium access scheduler 208 adjusts the medium access timing of transceiver 1 202 based on the medium access schedule established in block 626.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless device, comprising:
 a first wireless transceiver configured to access a first wireless network;
 a second wireless transceiver configured to access a second wireless network;
 a power state controller configured to switch the first wireless transceiver between an active state and a sleep state wherein power consumed by the first wireless transceiver while in the sleep state is reduced relative to the active state and configured to coordinate sleep state entry and duration timings for the first wireless transceiver with wireless medium access timings for the second wireless transceiver; and
 an medium access controller configured to alternately allocate a wireless medium to the first wireless transceiver and the second wireless transceiver;
 wherein the power state controller and the medium access controller are configured to coordinate power state switching of the first wireless transceiver and wireless medium access by the second wireless transceiver.

2. The wireless device of claim 1, wherein the access controller is configured to coordinate wireless medium access by the second wireless transceiver with the power state controller switching the first wireless transceiver to the sleep state.

3. The wireless device of claim 1, wherein sleep state entry and duration timings determined by the power state controller for the first wireless transceiver are decoupled from first wireless network access timings determined by the access controller.

4. The wireless device of claim 1, wherein the power state controller is configured to establish sleep state entry and duration timings for the first wireless transceiver and the access controller is configured to establish first wireless network access timings, based on a priority of a second network communication exceeding the priority of a first network communication and medium access timing of the second network communication.

5. The wireless device of claim 4, wherein the power state controller is configured to set the first wireless transceiver to be in the sleep state based on the second network communication is active, and set the first wireless transceiver to be in the active state based on the second network communication is inactive; and wherein the access controller is configured to allocate access time to the first wireless transceiver, the allocated access time being while the second network communication is inactive.

6. The wireless device of claim 1, wherein the first wireless transceiver is connected to a first basic service set and the second wireless transceiver is connected to a second basic service set.

7. The wireless device of claim 1, wherein the access controller is configured to transmit a message via the first wireless network, the message causing a receiving wireless device to allocate first wireless network access time based on time allocated for second network access by the access controller.

8. The wireless device of claim 1, wherein the access controller is configured to transmit a message via the first wireless network, the message causing a receiving wireless device to allocate second wireless network access time based on sleep state entry and duration times time applied to the first wireless transceiver by the power state controller.

9. The wireless device of claim 1, wherein the first wireless network is a wireless local area peer-to-peer network.

10. A combo device scheduler, comprising:
 a power state scheduler configured to schedule power state switching of a first wireless transceiver of a combo device between an active state and a sleep state wherein power consumed by the first wireless transceiver while in the sleep state is reduced relative to the active state; and
 a medium access scheduler configured to alternately schedule wireless medium access by the first wireless transceiver and a second wireless transceiver of the combo device;
 wherein the power state scheduler and the medium access scheduler are configured to coordinate power state switching of the first wireless transceiver and medium access of the second wireless transceiver and wherein the power state scheduler is configured to schedule first wireless transceiver sleep state entry and duration based on second wireless transceiver medium access scheduled by the medium access scheduler.

11. The combo device scheduler of claim 10, wherein the medium access controller is configured to schedule wireless medium access by the second wireless transceiver based on a schedule for the first wireless transceiver being in sleep state provided by the power state scheduler.

12. The combo device scheduler of claim 10, wherein the power state scheduler schedules first wireless transceiver power state switching independent of first wireless transceiver medium access scheduled by the medium access scheduler.

13. The combo device scheduler of claim 10, wherein the power state scheduler is configured to schedule first wireless transceiver sleep state entry and duration and the medium access scheduler is configured to schedule medium access for the first wireless transceiver based on:
- a priority of a scheduled communication via the second wireless transceiver exceeding a priority of a scheduled communication via the first wireless transceiver, and
- timing of the scheduled communication medium access via the second wireless transceiver.

14. The combo device scheduler of claim 10, wherein the power state scheduler is configured to schedule the first wireless transceiver to be in sleep state during intervals that the second wireless transceiver is scheduled for medium access, and schedule the first wireless transceiver to be in active state during intervals that the second wireless transceiver is not scheduled for medium access; and wherein the medium access scheduler is configured to schedule medium access by the first wireless transceiver during intervals that the second wireless transceiver is not scheduled to access the medium.

15. The combo device scheduler of claim 10, wherein the medium access controller is configured to transmit a message via the first wireless transceiver, the message causing a receiving wireless device to schedule medium access on a network over which the message is received based on a medium access schedule for the second wireless transceiver established by the medium access scheduler.

16. The combo device scheduler of claim 10, wherein the medium access scheduler is configured to transmit a message via the second wireless transceiver, the message causing a receiving wireless device to schedule, based on a sleep state scheduled for the first wireless transceiver by the power state scheduler, medium access on a network coexisting with the network over which the message is received.

17. A method for operating a combo device, comprising:
- determining, by the combo device, a schedule for switching a first wireless transceiver of the combo device between an active state and a sleep state, wherein power consumed by the first wireless transceiver while in the sleep state is reduced relative to the active power state;
- determining, by the combo device, a schedule for alternating wireless medium access between the first wireless transceiver and a second wireless transceiver of the combo device; and
- coordinating power state switching, by a power state scheduler, of the first wireless transceiver and wireless medium access by the second wireless transceiver as part of the determining of at least one of the schedule for switching and the schedule for alternating, comprising scheduling the first wireless transceiver sleep state entry and duration based on the schedule for the second wireless transceiver to access the medium.

18. The method of claim 17, wherein the coordinating comprises scheduling wireless medium access by the second wireless transceiver based on the schedule for the first wireless transceiver to be in sleep state.

19. The method of claim 17, wherein the schedule for switching the first wireless transceiver power state is determined independently from the schedule for medium access by the first wireless transceiver.

20. The method of claim 17, wherein the coordinating comprises scheduling first wireless transceiver sleep state and medium access based on a priority of a scheduled communication via the second wireless transceiver exceeding a priority of a scheduled communication via the first wireless transceiver, and scheduled medium access timing for the second wireless transceiver.

21. The method of claim 17, wherein the coordinating comprises:
- scheduling the first wireless transceiver to be sleep state while the second wireless transceiver is scheduled to access the medium;
- scheduling the first wireless transceiver to be active state while the second wireless transceiver is not scheduled to access the medium; and
- scheduling the first wireless transceiver to access the medium while the second wireless transceiver is not scheduled to access the medium.

22. The method of claim 17, further comprising transmitting a message, via the first wireless transceiver, the message causing a receiving wireless device to schedule, based on scheduled medium access for the second wireless transceiver, medium access on a network over which the message is received.

23. The method of claim 17, further comprising transmitting a message, via the first wireless transceiver, the message causing a receiving wireless device to schedule, based on a sleep state scheduled for the first wireless transceiver, medium access on a network coexisting with the network over which the message is received.

* * * * *